April 5, 1966     D. J. DUMIN     3,244,974
SUPERCONDUCTIVE DEVICE FOR DETECTING MAGNETIC FIELD INTENSITIES
Filed May 22, 1962
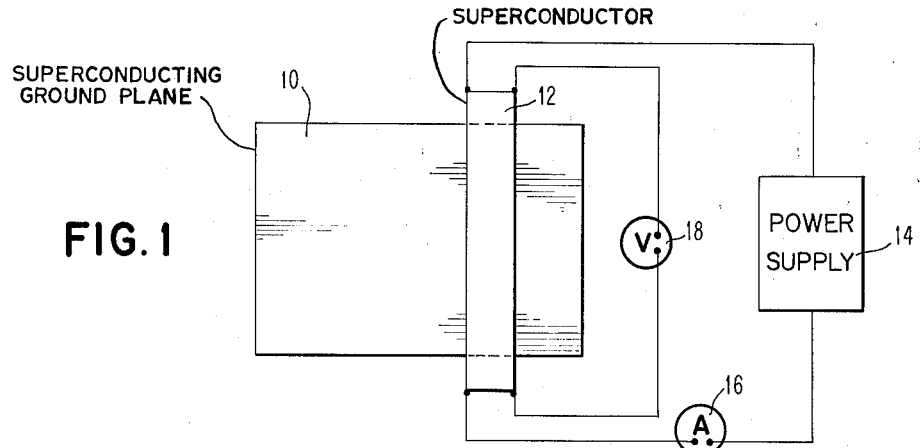
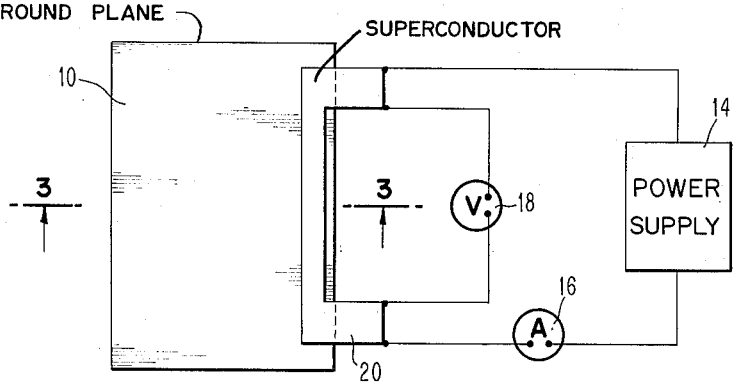
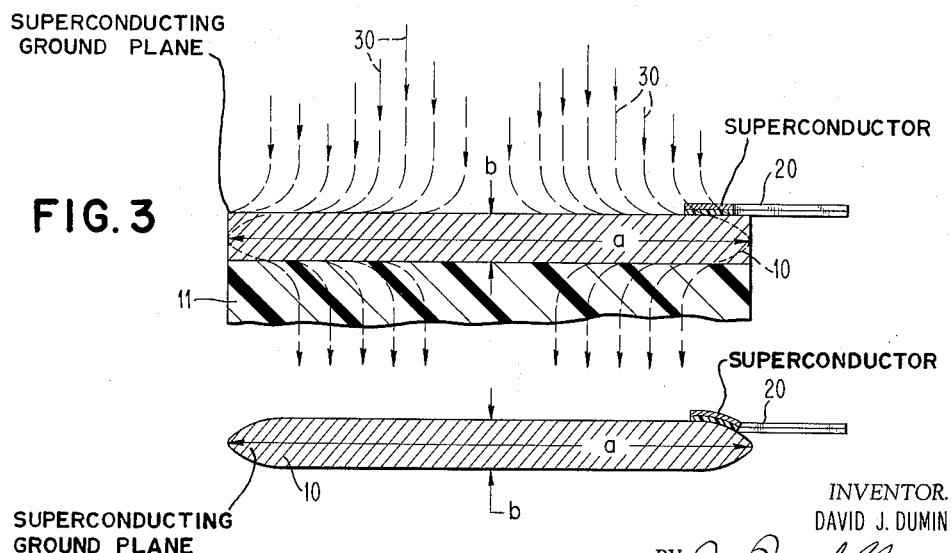
INVENTOR.
DAVID J. DUMIN
BY
ATTORNEY United States Patent Office 3,244,974
Patented Apr. 5, 1966

3,244,974
SUPERCONDUCTIVE DEVICE FOR DETECTING MAGNETIC FIELD INTENSITIES
David J. Dumin, Palo Alto, Calif., assignor to International Business Machines Corporation, New York, N.Y., a corporation of New York
Filed May 22, 1962, Ser. No. 196,733
5 Claims. (Cl. 324—46)

The present invention relates to a method and apparatus for detecting static magnetic fields and more particularly to such a method and apparatus utilizing superconductive phenomena.

It is often desirable in modern technology to be able to ascertain the existence, location of and/or the intensity of static magnetic fields such as the earth's magnetic field and other fields which might be due, for example, to power lines, heavy electrical equipment and the like. This is usually very difficult and especially so in the case of static fields or fields which are substantially static. With a dynamic magnetic field, conventional devices utilizing an inductive pick-up element of some sort may be employed to locate the dynamic lines of force, however, with a static magnetic field where the lines of force are essentially stationary it is necessary to either move the pick-up coil itself or utilize some other phenomenon for detecting the existence of such lines. Previously existing magnetometers for measuring static magnetic fields, have involved the use of bar magnets and a pendulum, saturable core instruments and search coils. However, these devices are generally very expensive and somewhat complicated to set up and use.

It has now been found that the unique diamagnetic properties of a superconducting film or ground plane in a magnetic field can be utilized to greatly concentrate a weak magnetic field within a relatively small area which together with an appropriately located superconductive gating element can be utilized in a manner to be set forth to determine the relative intensity and orientation of said magnetic field. The device has the advantages of being extremely simple in construction and requires a minimum of peripheral equipment and at the same time it is extremely sensitive.

It is accordingly a primary object of the present invention to provide a method and apparatus for concentrating and detecting weak static magnetic fields.

It is a further object to provide such a method and apparatus to measure the earth's magnetic field.

It is a still further object to provide such a method and apparatus which utilizes the effect of a superconductive thin film on a magnetic field.

It is another object to provide such a method and apparatus for measuring magnetic fields which is both uncomplicated and at the same time extremely sensitive.

It is yet another object of the invention to provide such an apparatus which may serve as a superconductive logic element operable by a magnetic field source remotely located from said element.

The foregoing and other objects, features and advantages of the invention will be apparent from the following more particular description of preferred embodiments of the invention, as illustrated in the accompanying drawings.

FIGURE 1 is a plan view of an apparatus suitable for performing the present invention schematically showing the electrical connections thereto.

FIGURE 2 is a plan view similar to FIGURE 1 of an embodiment of the invention illustrating an alternate configuration of the gate element which may be employed to increase the sensitivity of the device.

FIGURE 3 is a cross-sectional view taken along the line 3—3 of FIGURE 2, and

FIGURE 4 is a cross-sectional view similar to FIGURE 3 showing an alternative embodiment of the invention.

The objects of the present invention are accomplished in general by placing a very highly diamagnetic film in a magnetic field whose intensity is to be measured, locating a superconductive gate element adjacent to at least one edge of said film, maintaining said gate element at a superconductive temperature and measuring the critical current of said gate element while the diamagnetic film is so disposed in the magnetic field.

The apparatus for practicing said method preferably comprises a sheet of superconductive material, a gate element adjacent at least one edge of said sheet electrically insulated therefrom and lying within substantially all lines of flux which are forced to pass around said edge by the diamagnetic properties of said sheet a variable direct current power supply connected to opposite ends of said gate element and a detection means for determining current flow through said gate element and the switching point thereof.

It has been found that the almost perfect diamagnetic characteristic of a superconducting thin film properly maintained at a superconductive temperature in combination with a properly chosen and disposed gate element allows a very accurate determination of static magnetic fields. The diamagnetic properties of the superconductive thin film cause substantially all of the lines of flux impinging on the surface of said film to be deflected to flow parallel with the surface and ultimately around the edge thereof all within an extremely narrow physical band at said edge. By suitably placing a superconductive gate element within this concentrated magnetic field and calibrating said gate element the quantity of said magnetic field may be readily determined.

The invention will now be more particularly pointed out and described with reference to the drawings wherein FIGURE 1 shows an embodiment of the present invention wherein reference numeral 10 depicts a superconductive ground plane having a superconductive gate element 12 crossing two edges of the ground plane 10. An adjustable direct current power supply 14 is shown connected to opposite ends of the gate element 12 and, as will be explained later, is utilized to determine the critical current of said gate element. A current sensing element shown as a meter 16 is connected in series with the power supply and is utilized to determine the critical current of said gate element together with voltmeter 18 which indicates when the gate element switches from superconductive to resistive due to a combination of self-induction and the magnetic field which is being measured as will be explained more fully subsequently. The device shown in FIGURE 2 is essentially the same as that of FIGURE 1, however, the gate element 20 of FIGURE 2 is shaped somewhat differently than that of FIGURE 1 and extends almost entirely along the one edge of ground plane 10. The reason for this preferred configuration is that thereby the gate element is acted on by a greater portion of the lines of flux which are concentrated adjacent the edge of the ground plane thus rendering the gate element more sensitive since it is effected by a greater number of lines of flux concentrated by the ground plane. Alternatively, the gate element could be made to extend along more than one edge.

Referring now to FIGURE 3, which is a cross-sectional view of the device of FIGURE 2, the lines of flux 30 are shown to be substantially perpendicular to the ground plane 10 and are randomly spaced across the surface thereof as would be the case with any static magnetic field, for example, the earth's magnetic field. It will be seen that as these lines approach the superconducting thin film they bend and are forced to flow along the surface of the film to a point adjacent the edge thereof where they are highly compacted or concentrated. The gate element 20 will be seen to be located as far within this concentrated field as possible. It should be noted that for practical purposes the superconducting portion of such a ground plane is most accurately represented by the dotted line shown in FIGURE 3. This is because the high concentration of magnetic flux at or along the surface of the superconducting film 10 actually switches a portion of the surface of the film resistive and hence no longer diamagnetic. Thus, a small portion of the magnetic flux passes through the outer surface of the film near the edge. It has been found that the effective superconductive cross-section of such a film is approximated by an ellipse having axes $a$ and $b$.

The flux concentration at the edge of such a ground plane is represented by the formula: $H = H_A(1 + a/b)$ where $H$ = the flux density at the edge
$H_A$ = the average normal flux density striking the surface of the plane
$a$ = major axis of the ellipse ≅ the width of the plane
$b$ = minor axis of the ellipse ≅ the thickness of the plane Thus it may be seen that for a ground plane 5000 angstroms in thickness and, for example, 1 centimeter wide, the theoretical flux concentration at the edge will be on the average of $2 \times 10^4 H_A$. Reference to this formula may be found on page 167 of Shoenberg's "Superconductivity," as well as a discussion of the principles involved.

The cross-sectional view of a superconducting film and gate element shown in FIGURE 4 represents what would be an optimized structure for such a device according to the present invention since the basic geometry of the superconducting film relative to its effect on the lines of magnetic flux tend to force same into an elliptical path of great eccentricity this structure would allow placement of the gate element 20 into an even denser portion of the magnetic flux passing around the edge of the ground plane 10.

In explaining the operation of the instant device it is to be understood that the superconducting ground plane and gate element must be immersed in a suitable cryogenic liquid, such as liquid helium, in order for the superconductive phenomenon to take place. The temperatures at which such superconduction takes place are normally below 4.2° Kelvin, the exact temperature necessary depends upon the materials used. These temperatures are usually attained by using liquid helium. In practicing the present invention a double walled vacuum insulated container known in the art as a Dewar flask and made of a material which will not affect the magnetic field, such as glass, must be used. The use of such a Dewar and the forming of electrical connections to a superconductive device so immersed is well known in the cryogenic art.

It should be noted that the operation of the two embodiments of the invention of FIGURES 1 and 2 is the same, the difference being that the device of FIGURE 2 is somewhat more sensitive and that a larger portion of the gate element is exposed to the concentrated magnetic field occurring at the edge of the ground plane as set forth above. The primary purpose of the highly diamagnetic ground plane 10 is to cause a concentration of the lines of flux impinging upon the surface thereof at the surface of said film adjacent the edge. The operation of the present invention relies on the combined effects of the concentrated magnetic field at the edge of the ground plane plus the self-switching of the gate element, due to self-induction, to switch same from a superconductive to the resistive state when the critical current is reached. As is well known, such a superconductive gate element will switch by itself when a sufficient amount of current is passed therethrough. This current is known as the critical current. In a normal cryotron, a control conductor is used adjacent to the gate element and current passed therethrough when it is desired to switch the gate element from superconductive to resistive, with the switching effect of the current in the gate element itself being negligible. In this case almost all of the switching magnetic field is supplied by what is commonly known as the control winding or conductor.

With the present invention, the self-induction switching of the gate element plays a very important part in the operation of the device as the critical current will vary for a given structure with the intensity of the external or stray magnetic field impinging upon the device, thus as a stronger magnetic field impinges upon the gate element less current is required in the gate element to cause same to switch. Thus, the magnitude of the critical current will vary inversely with the magnitude of the impinging magnetic field.

In operation the device is placed in a given magnetic field and stabilized at the required cryogenic temperature and the power supply is varied to increase the current through the gating element gradually until it is noted by virtue of a sudden rise on the voltmeter 18 that a switching has occurred in the gating element. A reading of the ammeter 16 is noted and this reading is directly indicative of the magnitude of the field in which the device is located.

The device may be calibrated by carefully measuring the critical currents for the device in known magnetic fields, such measurement and calibration being obtained under very precise procedures. Thus, when the device is used in practice to measure a magnetic field, the magnitude of the critical current can be directly related to the previous calibration to give a very accurate measurement of the actual magnetic field which is being detected.

It should be noted that for greatest sensitivity, the ground plane should be located at substantially right angles to the impinging magnetic field which is to be measured. The quantity $H_A$ in the above formula refers to the normal or normal component of impinging flux, thus the normal component is maximized when the ground plane is perpendicular to the field.

The device of the present invention is most suitably made by any of a number of known vapor deposition processes where the superconducting ground plane is first laid down or deposited upon a suitable substrate indicated at 11 in FIGURE 3 and an insulative layer placed on the top thereof and then the gate element laid down in a desired area by the same vapor process. For optimum results, the ground plane should be a harder superconductive material than the gating element, that is, it should have a higher critical current. Suitable materials for practicing the invention have been found to be lead for the ground plane and tin for the gate element.

A superconductive device built and calibrated as set forth above has utility as a very sensitive instrument for detecting weak magnetic fields. Further, by means of suitable auxiliary equipment for supplying current in very gradual and precise increments to the gate element and for continually monitoring the amount of said current and for detecting very accurately the switch-over point of the gate element, very precise measurements of the magnitude of a magnetic field may be obtained. The obvious utility for a device so equipped and calibrated is as a very sensitive magnetometer for measuring, for example, the earth's magnetic field at various points on the surface of the earth, or in laboratory areas where precise knowledge of existing magnetic fields is necessary.

A further use for the broad concept of the invention is to provide a superconductive circuit element which can simply detect the existence or non-existence of a magnetic field not directly associated with the device such as the field from a remote control winding whereby the device will function as a conventional cryotron. Such a device is convenient where it is not expedient to locate the energizing means within the low temperature region. Such a device could be used in computer circuitry or merely as an indicator for monitoring the occurrence or non-occurrence of a condition predicated upon the existence or non-existence of an external magnetic field. In such case, the source of the magnetic field would not have to be cooled to superconductive temperatures as is the usual case with prior art cryotrons and the like, where the control winding is incorporated as an integral part of the cryotron and immersed in the cooling fluid. By avoiding such immersion of the control winding or other magnetic field source considerable improvement in the over-all thermal efficiency may be attained with attendant savings in refrigerant costs.

While the method for making the device above is indicated to be by vapor deposition as is often used in the fabrication of such superconductive elements, it is to be understood that the invention is not intended to be limited thereby. For example, ground plane and gate elements could be fabricated from foil as well as any other of a large number of possible fabrication methods utilized. The thickness of planes laid down by the vapor deposition method is usually between about 5000 and 10000 angstroms in thickness. The use of such extremely thin members results in more sensitive devices and thus is to be preferred. It should also be noted that in usual cryotrons it is desirable to have relatively high critical currents for reasons of stability and circuit reliability as well as enabling practical power outputs. However, with the present invention it is preferred to provide structures having low critical currents to achieve greater sensitivity.

While the invention has been particularly shown and described with reference to preferred embodiments thereof, it will be understood by those skilled in the art that various changes in form and details may be made therein without departing from the spirit and scope of the invention.

What is claimed is:

1. A device for concentrating and detecting magnetic fields which comprises:
   (a) a sheet of superconductive material,
   (b) a gate element adjacent to at least one edge of said sheet, electrically insulated therefrom and lying within substantially all lines of flux which pass around said one edge of said sheet by virtue of the diamagnetic properties thereof,
   (c) a variable direct current power supply connected to opposite ends of said gate element,
   (d) detection means operatively connected to said gate element for determining current flow through and the switching characteristics of said gate element and,
   (e) means for maintaining said device at superconductive temperatures.

2. A device as set forth in claim 1 wherein the sheet of superconductive material is a harder superconductor than that of the gate element.

3. A device as set forth in claim 2 wherein the sheet of superconductive material is lead and the gate element is tin.

4. A device as set forth in claim 1 wherein the sheet of superconductive material is vapor deposited upon a suitable substrate and the gate element is a vapor deposited strip line separated from said sheet by a very thin layer of insulating material.

5. A device as set forth in claim 1 wherein the gate element is a strip line which crosses at least one edge of said superconductive sheet.

References Cited by the Examiner
UNITED STATES PATENTS

| | | | |
|---|---|---|---|
| 2,942,177 | 6/1960 | Neumann et al. | 324—46 |
| 2,989,714 | 6/1961 | Park et al. | 307—88.5 |
| 3,025,416 | 3/1962 | Johnson | 307—88.5 |

OTHER REFERENCES

"Critical Currents of Superconducting," by Aron and Hitchcock, Journal of Applied Physics, volume 33, No. 7.

Geometric Effects in the Superconducting Transition of Thin Films, M. D. Reeber, I.B.M. Journal, April 1959, pages 140–146.

WALTER L. CARLSON, *Primary Examiner.*